(12) United States Patent
Gyongyi et al.

(10) Patent No.: US 10,430,484 B2
(45) Date of Patent: *Oct. 1, 2019

(54) DETERMINING RELEVANCE OF POINTS OF INTEREST TO A USER

(71) Applicant: Google Inc., Mountain View, CA (US)

(72) Inventors: Zoltan Gyongyi, Menlo Park, CA (US); Frank Worsley, San Francisco, CA (US); Darryl DeWeese, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/420,927

(22) Filed: Jan. 31, 2017

(65) Prior Publication Data

US 2017/0139935 A1    May 18, 2017

Related U.S. Application Data

(63) Continuation of application No. 14/296,179, filed on Jun. 4, 2014, now Pat. No. 9,594,808.

(51) Int. Cl.
*G06F 16/00* (2019.01)
*G06F 16/9537* (2019.01)
*G06F 16/29* (2019.01)
*G06F 16/2457* (2019.01)

(52) U.S. Cl.
CPC .... *G06F 16/9537* (2019.01); *G06F 16/24578* (2019.01); *G06F 16/29* (2019.01)

(58) Field of Classification Search
CPC . G06F 16/9537; G06F 16/29; G06F 16/24578
See application file for complete search history.

(56) References Cited

U.S. PATENT DOCUMENTS

| 8,108,778 | B2 | 1/2012 | Athsani et al. |
| 8,583,668 | B2 | 11/2013 | Higgins et al. |
| 8,600,619 | B2 | 12/2013 | Bales et al. |
| 2003/0225589 | A1 | 12/2003 | Eaton et al. |
| 2007/0143345 | A1 | 6/2007 | Jones et al. |
| 2010/0287178 | A1 | 11/2010 | Lambert et al. |
| 2013/0345957 | A1 | 12/2013 | Yang et al. |

(Continued)

FOREIGN PATENT DOCUMENTS

| CN | 101317175 A | 12/2008 |
| CN | 102483824 A | 5/2012 |

(Continued)

OTHER PUBLICATIONS

WO 2014/176897, Cheng, 2013 (Year: 2013).*

(Continued)

*Primary Examiner* — Robert W Beausoliel, Jr.
*Assistant Examiner* — Hau Hoang
(74) *Attorney, Agent, or Firm* — Middleton Reutlinger

(57) ABSTRACT

Methods and apparatus related to determining points of interest based on content of one or more sources associated with a user. Relevance scores are determined for the points of interest based on additional information associated with the user and the content. Point of interest information that is related to the points of interest is provided based on the determined relevance scores.

16 Claims, 8 Drawing Sheets

(56) References Cited

U.S. PATENT DOCUMENTS

2014/0074873 A1* 3/2014 Ngo ................ G06F 17/30241
                                                       707/758
2014/0365459 A1   12/2014 Clark et al.
2015/0066962 A1    3/2015 Cortes

FOREIGN PATENT DOCUMENTS

| WO | 2003032106 | 1/2005 |
| WO | 2013020075 | 7/2013 |
| WO | 2013184249 | 12/2013 |

OTHER PUBLICATIONS

International Search Report and Written Opinion of PCT Serial No. PCT/US15/33539 dated Aug. 6, 2015.
European Patent Office; Communication issued in Application No. 15727294.9 dated Feb. 20, 2018.
European Patent Office; Summons to Attend Oral Proceedings issued in Application No. 15727294.9; dated Nov. 29, 2018; 10 pages.
China National Intellectual Property Administration; Office Action issued in Application No. 201580029652.0 dated Feb. 2, 2019.
European Patent Office; Brief Communication issued in Application No. 15727294.9 dated Apr. 9, 2019.
European Patent Office; Decision to Refuse issued in Application No. 15727294.9 dated May 6, 2019.

* cited by examiner

DETERMINING RELEVANCE OF POINTS OF INTEREST TO A USER

BACKGROUND

A user may submit a mapping request that indicates a geographic location. The user may be provided with a map that is responsive to the request and may include one or more indications of points of interest in the geographic location. For example, a user may submit a mapping request for a geographic area and be provided with a map that includes indications of one or more businesses and/or attractions of the geographic area.

SUMMARY

The present disclosure is generally directed to methods and apparatus to determine points of interest that are personal to the user. More particularly, the disclosure is directed to methods and apparatus to determine a point of interest for a user based on content from one or more sources associated with the user and determine a relevance score for the point of interest based on additional information associated with the user. The additional information may be identified from the same source that was utilized to determine the point of interest and/or alternate sources may be utilized to identify the additional information. In some implementations, the point of interest and associated relevance score may be utilized in determining when and/or how to provide point of interest information to the user via a mapping application and/or other application that displays or otherwise provides one or more points of interest. For example, in some implementations, relevance scores for points of interest may be utilized to determine prominence of provided point of interest information.

In some implementations, a method is provided and includes the steps of: identifying content from one or more sources associated with a user; determining a point of interest based on the content; identifying additional information associated with the user and associated with the content; determining a relevance score for the point of interest based on the additional information; and providing, based on the relevance score, point of interest information related to the point of interest.

This method and other implementations of technology disclosed herein may each optionally include one or more of the following features.

The step of providing the point of interest information may include providing a visual indication of the point of interest via a mapping application. The step of providing, based on the relevance score, may include determining a prominence level for the visual indication based on the relevance score. The step of providing, based on the relevance score, may include determining whether to provide the visual indication based on the relevance score.

The additional information may be indicative of one or more interactions of the user with the point of interest. The additional information may be indicative at least one of: frequency of the interactions of the user with the point of interest, duration of the interactions of the user with the point of interest, and regularity of interactions of the user with the point of interest. The additional information may be indicative of time since the user interacted with the point of interest.

The additional information may be indicative of a trustworthiness measure associated a provider of the content from which the point of interest is determined.

The additional information may be indicative of prominence of the content associated with the point of interest in one or more of the sources.

The additional information may be indicative of frequency of the content associated with the point of interest in one or more of the sources.

The step of determining the point of interest may include the steps of: determining a first location entity based on the content; determining, based on information external to the content, a mapping of the first location entity to a point of interest entity; and determining the point of interest based on the point of interest entity. The step of determining the point of interest may further include the steps of: determining a second location entity based on the content; and determining, based on information external to the content, a mapping of the second location entity to the point of interest entity. The step of determining the relevance score may include determining a distance between the first location entity and the point of interest entity, and wherein the step of determining the relevance score may include the step of determining a distance between the second location entity and the point of interest entity.

The method may further include the steps of: determining a second point of interest based on the content; determining a second relevance score for the second point of interest based on the additional information; and providing, based on the second relevance score, second point of interest information related to the second point of interest.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine a point of interest based on content from sources associated with a user. Additional information from one or more of the sources may be utilized to determine a relevance score for the determined point of interest. Particular implementations determine when and/or how to provide point of interest information to the user based on the determined relevance score for the point of interest.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
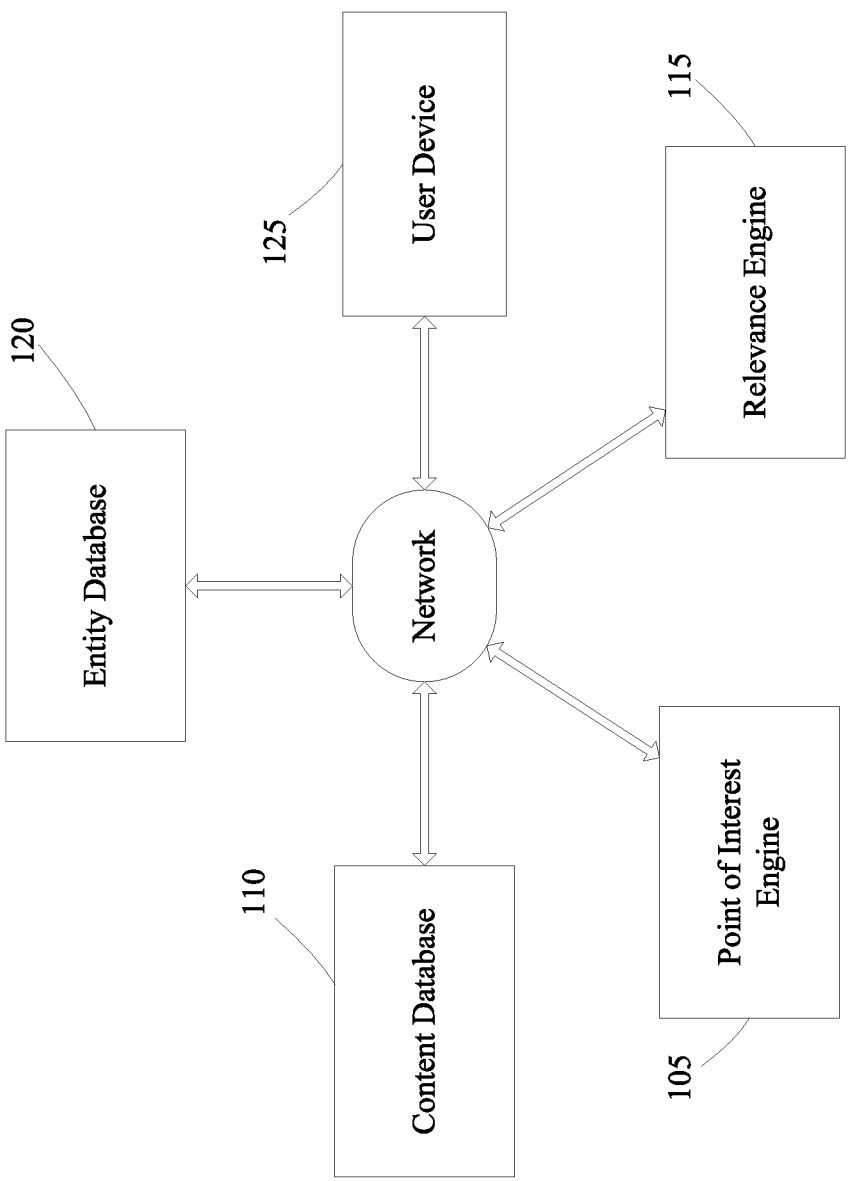
FIG. 1 is a block diagram of an example environment in which points of interest for a user may be determined and/or provided to the user.

One or more points of interest for a user may be determined from content of sources associated with the user. Additional information may be identified from content of one or more sources associated with the user and utilized to determine a relevance score for the determined point of interest. For example, a user may be associated with an email that includes flight information for an upcoming flight, such as the arrival airport and/or the departure airport for a flight. Also, for example, an email may be associated with one or more times that may be utilized to determine a relevance score for a point of interest, such as a time that the user received the email and/or a time that the user last accessed the email. Content of the email may be utilized to determine the arrival and/or departure airports as points of interest. Additional information may be identified from the content of the email, such as the sender of the email and/or the prominence of the airport indications in the email. Also, for example, additional information may be identified from one or more additional sources associated with the user, such as a calendar entry of the user and/or location information of the user.

Based on the additional information that is associated with the user, relevance scores may be determined for the points of interest that are indicative of likelihood that the points of interest are relevant to the user and/or that the user has interest in being provided information related to the points of interest. For example, a relevance score for the arrival airport that is determined to be a point of interest may be determined based on identifying that the email that included content regarding the airport was sent by a trusted source, such as an airline booking department and/or from an online travel booking agent. Also, for example, a relevance score for the arrival airport point of interest may be determined based on identifying that the user has created a calendar entry for a flight that includes the same airport code as the determined arrival airport point of interest. Also, for example, previous location information of the user may be utilized and a relevance score for the arrival airport point of interest may be determined based on identifying frequency of presence of the user at the arrival airport. For instance, in some implementations, a relevance score that is less indicative of relevance may be determined for an airport arrival point of interest that is more frequented by the user than a relevance score for a another point of interest that is less frequented by the user. Such relevance scores may reflect that an airport that is more frequented by the user is likely more familiar to the user and less likely to be of interest to the user. Also, for example, in some instances, a relevance score may be determined for a first point of interest that is more indicative of relevance than the relevance score for a second point of interest that is less frequented by the user than the first point of interest.

The user may be provided one or more points of interest via one or more applications, such as a mapping application. In some implementations, one or more determined points of interest are provided based on the determined relevance scores of the points of interest. In some implementations, prominence of provided point of interest information for a point of interest may be determined based on the relevance score of the point of interest. For example, a relevance score for a point of interest may be utilized to determine the size of an indication of the point of interest on a map and/or the ranking of the point of interest in a listing of points of interest. In some implementations, determining when to provide point of interest information to the user for a point of interest may be based on the relevance score of the point of interest. For example, a point of interest may be provided to the user only if the relevance score satisfies a threshold.

FIG. 1 illustrates a block diagram of an example environment in which points of interest for a user may be determined and/or provided to the user. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a point of interest engine 105, a content database 110, a relevance engine 115, an entity database 120, and a user device 125. The user device 125 may execute one or more applications, such as a web browser and/or a mapping application.

In some implementations, point of interest engine 105 may identify sources that are associated with a user. Sources may include, for example, emails, instant messages, documents, web history, calendar entries, current location data of the user, previous location data of the user, addresses of contacts from a contacts collection of the user (e.g., email contacts, phone contacts), etc. In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. In some implementations, point of interest engine 105 may identify sources with certain data that has been treated in one or more ways to remove personal identifiable information and/or other information.

Point of interest engine 105 may identify content from one or more sources and determine whether the identified content is associated with a point of interest. Content from a source may include, for example, one or more terms from a source, formatting of one or more terms from a source, location of one or more terms in a source, author and/or sender of a source, and/or metadata that may be included in a source. In some implementations, point of interest engine 105 may identify the entire content of a source. For example, point of interest engine 105 may identify all of an email of the user. In some implementations, point of interest engine 105 may identify only portions of content from a source that are potentially related to a point of interest.

In some implementations, content database 110 may include one or more storage media and may be utilized to store and/or access one or more aspects of information described herein. For example, content database 110 may be utilized by one or more components to store, modify, and/or access content from one or more sources associated with a user. In some implementations, the content database 110 may store content and/or sources of multiple users, and, for each entry, access to the source and/or content may be allowed only for the user and/or one or more other users or components authorized by the user, such as point of interest engine 105. In some other implementations, the content database 110 may store only content and/or sources for a single user.

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

In some implementations, point of interest engine 105 may identify content that is associated with a user via content database 110. For example, content database 110 may include content from one or more sources that have previously been identified as potentially including content related to one or more points of interest. Also, for example, content database 110 may include content from one or more sources that have not previously been identified by point of interest engine 105 or other component as including content related to a point of interest.

In some implementations, point of interest engine 105 may identify all content of a user from content database 110. In some implementations point of interest engine 105 may use a rules-based and/or other approach to identify a subset of the sources and/or content that may likely be related to a point of interest. For example, point of interest engine 105 may determine that all sources that include an address may likely include content that is related to a point of interest. Also, for example, point of interest engine 105 may determine that all content that originates from an airline may be associated with a point of interest. Also, for example, point of interest engine 105 may determine that a source that includes one or more key terms is likely related to a point of interest, such as sources that include "flight," "hotel," and/or "reservations."

Point of interest engine 105 may determine a point of interest based on the identified content. A point of interest is an identifier of a physical location that may be utilized to present information related to the physical location to the user. Examples of points of interest include a unique identifier of a physical location, such as one or more street addresses of the location, an entity identifier of the location, and/or one or more longitude and latitude coordinates, etc. Also, the point of interest may define the physical location with any level of granularity. For example, the point of interest may define a particular coordinate, a particular building, a particular portion of a building, a particular geographic area (neighborhood, park, entire city), and/or all or a portion of a particular terrain feature (street, highway, body of water, bridge, etc.).

In some implementations, point of interest engine 105 may utilize one or more rules to determine points of interest from identified content. For example, point of interest engine 105 may determine a point of interest based on identifying one or more terms that conform to an address (e.g., "123 Airport Road" conforming to a rule of [number] [street name]). Also, for example, point of interest engine 105 may identify an airport code based on identifying three capitalized letters (e.g., "LAX" and/or "SFO") near one or more terms that are indicative of an airport, such as "airport," "departs," and/or "arrives."

Figure 2:
FIG. 2 is an illustration of a sample message that includes content that may be utilized to determine a point of interest.

Referring to FIG. 2, an illustration of a sample source that includes content that may be utilized to determine a point of interest is provided. The source is an email 200 that may be provided to a user in response to the user booking a flight via an airline and/or an online travel company. The email includes departure information, including an airport designation 210, and arrival information. Additionally, the email 200 includes sender information 205.

Point of interest engine 105 may receive email 200 via content database 110 and/or an email service. In some implementations, point of interest engine 105 may determine a point of interest based on one or more terms in the email 200 utilizing a rules-based approach. For example, point of interest engine 105 may identify airport designation 210, "LAX," as conforming to one or more rules that identify an airport code and may utilize "LAX" as a point of interest and/or determine a point of interest based on "LAX" (e.g., an address mapped to LAX, lat/long mapped to LAX, and/or an entity identifier mapped to LAX). In some implementations, point of interest engine 105 may determine additional information associated with a determined point of interest utilizing rules-based approach. For example, point of interest engine 105 may identify "Apr. 30, 2014" as conforming to one or more rules that identify a date and further identify that "Apr. 30, 2014" is associated with LAX based on one or more rules such as a rule that considers proximity of "Apr. 30, 2014" to "LAX".

In some implementations, point of interest engine 105 may determine a point of interest based on one or more terms in the email 200 utilizing a classifier based approach. For example, point of interest engine 105 may include a classifier trained to identify if one or more segments of a source are indicative of a point of interest based on the one or more segments and/or additional signals of the source. For example, point of interest engine 105 may classify a term in an email as indicative of a point of interest based on one or more signals from the content of the email, such as signals related to the term itself, signals related to one or more terms before and/or after the term, signals related to the position of the term in the email, and/or signals related to metadata of the source. One or more signals may optionally include signals based on processing of the source by one or more additional components. For example, signals may include signals related to parts of speech of one or more terms, syntactic relationships of one or more terms, etc. and such signals may be based on output of a parser. A classifier of point of interest engine 105 may be trained to classify segments as points of interest based on previous training utilizing supervised or semi-supervised training techniques. Additional or alternative rules-based and/or classifier-based techniques may be utilized to determine a point of interest from content of a source.

Figure 3:
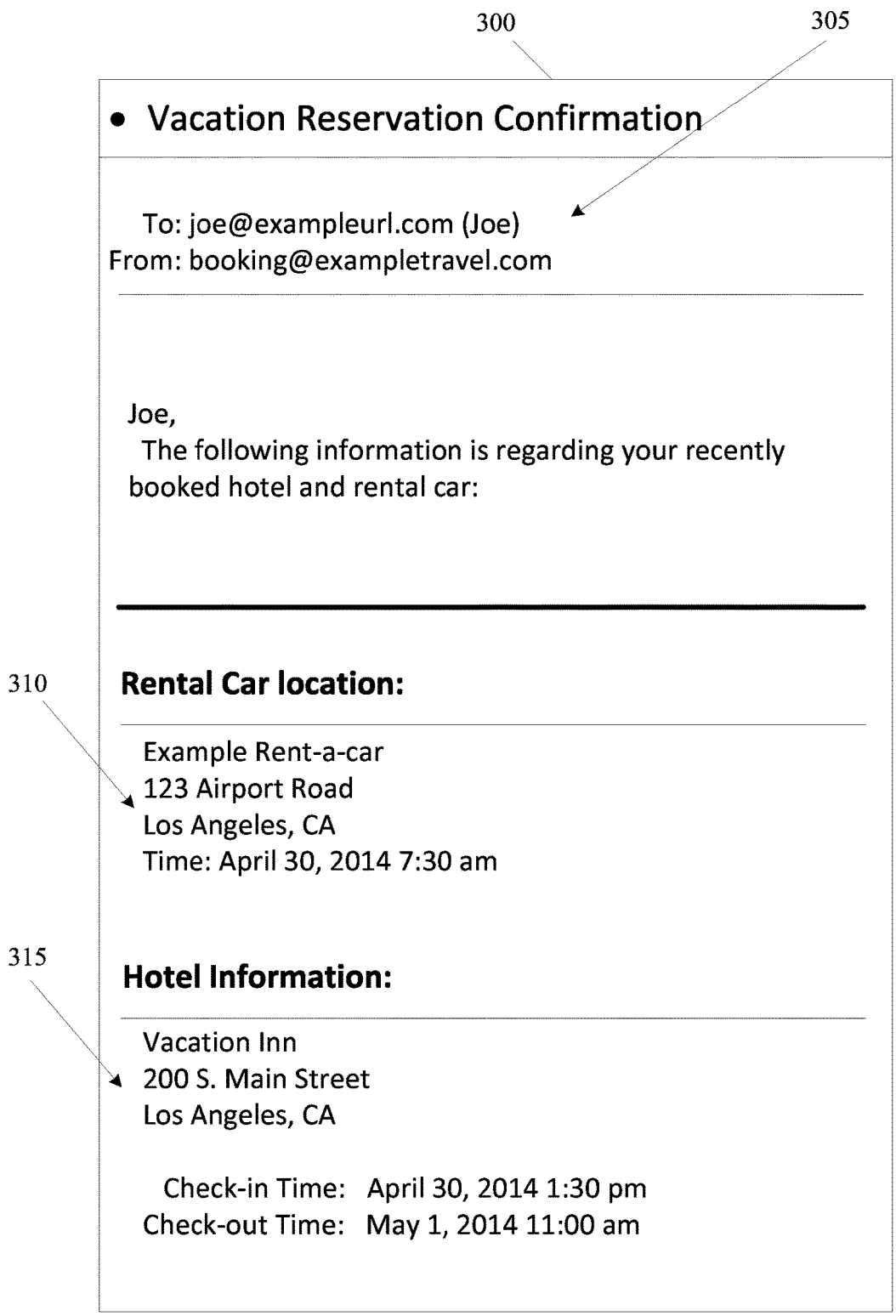
FIG. 3 is an illustration of another sample message that includes content that may be utilized to determine a point of interest.

In some implementations, point of interest engine 105 may determine a point of interest based directly on content from a source. For example, referring to FIG. 3, another example source is provided that includes content that may be utilized to determine a point of interest. The source is an email 300 that includes sender information 305, rental car address 310, and hotel address 315. Point of interest engine 105 may determine "123 Airport Road" and/or "200 S. Main Street" as points of interest based on the terms complying with an address format. Also, for example, point of interest engine 105 may determine that "123 Airport Road" is a point of interest utilizing other terms in addition to "123 Airport Road," such as by identifying that "123 Airport Road" is near hotel address 315, determining that the sender of email 300 is related to the rental car location, and/or based on other terms in email 300.

In some implementations, point of interest engine 105 may determine a point of interest indirectly based on one or more terms of identified content. For example, referring again to FIG. 2, email 200 includes airport designation 210, "LAX," as content. Point of interest engine 105 may identify that "LAX" is an airport code based on, for example, one or more additional terms in the message ("Flight," "Departs," "Arrives," etc.) and/or comparison to a list of airport codes. Point of interest engine 105 may utilize entity database 120 to identify an entity that is mapped to "LAX" and further identify an address, such as "500 Airport Road," that is mapped to the same entity. Point of interest engine 105 may determine the associated address as the point of interest based on the identified association between the airport designation 210 and the address "500 Airport Road" in entity database 120.

In some implementations, point of interest engine 105 may identify a location from the content of a source and determine a point of interest that is related to the identified location. For example, referring to FIG. 3, point of interest engine 105 may identify "123 Airport Road" as an address and further identify "123 Airport Road" as the address of a rental car location based on, for example, one or more terms in email 300 and/or based on identifying a "car rental location" entity in entity database 120 that is mapped to "123 Airport Road." Point of interest engine 105 may determine that a gas station near a rental car location as a point of interest that is related to the rental car location. Point of interest engine 105 may determine a point of interest that is a gas station near the rental car location. For example, point of interest engine 105 may identify "123 Airport Road" as content in email 300, identify a "rental car location" entity that is mapped to "123 Airport Road," and further identify a "gas station" entity that is associated with the "rental car location" entity. Point of interest engine 105 may determine the address or other identifier of the "gas station" entity as a point of interest based on the identified association.

In some implementations, point of interest engine 105 may identify two or more locations from content of a source and determine a point of interest that includes a path between the two or more locations. For example, point of interest engine 105 may identify a hotel location and an airport location from one or more sources. Point of interest engine 105 may determine a point of interest that is a path between the identified locations. For example, point of interest engine 105 may identify one or more roads, public transportation lines, and/or other paths that may be utilized by the user to travel from one of the identified locations to one or more other locations.

In some implementations, point of interest engine 105 may determine a point of interest from a related location identified from content based on a determined relationship between a class of an identified location and a class associated with the point of interest. A relationship between a location that is identified in content of a source and a point of interest may be determined from entity database 120. For example, point of interest engine 105 may determine that "123 Airport Road" is a location with an entity class of "rental car location" and determine from one or more databases, such as entity database 120, that the entity class "rental car location" and the entity class "gas station" are associated with one another. In some implementations, point of interest engine 105 may identify a gas station that is proximate to the rental car location based on identifying the relationship between "rental car location" and "gas station." In some implementations, a rule may be utilized to determine a relationship between a location that is identified from content of a source and a point of interest. For example, point of interest engine 105 may identify a rental car location in content of a source and identify a rule to determine a gas station as a point of interest based on identifying the rental car location.

In some implementations, point of interest engine 105 may determine multiple points of interest based on the same segment of content of a source. For example, referring to FIG. 4, an example illustration of a source that may be utilized to determine multiple points of interest is provided. The message trail 400 includes a reference to "Chain Restaurant," which may have multiple locations. Point of interest engine 105 may determine multiple locations of "Chain restaurant" from one or more databases and determine that each location may be a point of interest for the user. For example, point of interest engine 105 may identify a "Chain Restaurant" entity in entity database 120 that is mapped to multiple addresses. In some implementations, multiple points of interest may be provided to relevance engine 115 to determine, based on additional information from one or more sources, whether one or more of the locations is more relevant to the user, as described herein. For example, point of interest engine 105 may determine multiple gas stations as points of interest and relevance engine 115 may determine relevance scores for the points of interest based on distance between the gas stations and one or more locations, such as distance between each gas station and a rental car location.

Point of interest engine 105 may store one or more determined points of interest in content database 110 for later utilization by one or more components. For example, point of interest 105 may store "123 Airport Road" as a location in content database 110 and later provide "123 Airport Drive" to relevance engine 115 to determine a relevance score for the point of interest. In some implementations, point of interest engine 105 may store all or part of the content utilized to determine the point of interest in content database 110 with the point of interest. For example, point of interest engine 105 may determine a point of interest of "123 Airport Road" from email 300 and store email 300 with the determined point of interest in content database 110.

Also, for example, point of interest engine 105 may store "123 Airport Road" with only sender information 305.

Relevance engine 115 identifies additional information from one or more sources associated with the user and utilizes the additional information to determine a relevance score for a point of interest based on the additional information. In some implementations, relevance engine 115 may be a component of point of interest engine 105. For example, point of interest engine 105 may identify content, determine a point of interest from the content, and determine a relevance score for the point of interest based on additional information. In some implementations, relevance engine 115 identifies additional information from content of the same source that was utilized to determine the point of interest. For example, point of interest engine 105 may determine a point of interest based on an email of the user and relevance engine 115 may determine a relevance score based on additional information that is included in the email, such as the sender of the email, formatting of one or more terms in the email, and/or location of a reference to the point of interest in the email. In some implementations, content of a source may not include identifying information. For example, relevance engine 115 may be provided with a classification of a sender of a message (personal contact of the user, advertiser, online service, etc.) without being provided with identifying information of the sender. In some implementations, relevance engine 115 may identify additional information from one or more sources that is separate from the source that was utilized by point of interest engine 105 to determine the point of interest. For example, point of interest engine 105 may determine a point of interest from an email of the user and relevance engine 115 may identify a second email as additional information and/or identify additional information from a different type of source, such as GPS data of the user and/or web history of the user.

In some implementations, relevance engine 115 may identify additional information from one or more sources that were previously utilized to determine the points of interest. For example, point of interest engine 105 may determine a point of interest from Email 1 and provide the point of interest to relevance engine 115 to determine an initial relevance score for the point of interest. Relevance engine 115 may store the point of interest, the determined relevance score, and/or content from the source in content database 110. Subsequently, point of interest engine 105 may determine the same point of interest from Email 2 and provide the point of interest to relevance engine 115. Relevance engine 115 may identify Email 1 as additional information to utilize to determine a relevance score for the point of interest. For example, relevance engine 115 may identify a count of occurrences of references to the point of interest in Email 1 as additional information to determine a relevance score. Also, for example, relevance engine 115 may utilize the previously determined relevance score of the point of interest to determine a new relevance score. Relevance engine 115 may store the point of interest, the new relevance score, and/or the content of Email 1 and/or Email 2 in content database 110 to utilize for subsequent determinations of relevance scores.

Relevance engine 115 may identify additional information from sources based on identifying one or more sources that include content related to the determined point of interest. For example, point of interest engine 105 may provide a point of interest to relevance engine 115 and relevance engine 115 may identify content that includes the point of interest. For example, point of interest engine 105 may determine "123 Airport Road" as a point of interest based on email 300, and store the point of interest and the content of email 300 in content database 110. Subsequently, point of interest engine 105 may determine "123 Airport Road" from another source and provide relevance engine 115 with "123 Airport Road" as a point of interest. Relevance engine 115 may identify email 300 from content database 110 as additional information based on identifying that email 300 was previously determined to include content associated with "123 Airport Road." In some implementations, point of interest engine 105 may determine a point of interest that is an entity identifier. For example, point of interest engine 105 may determine a point of interest as a "Los Angeles International Airport" entity. Relevance engine 115 may identify additional information in sources that include content that is mapped to the point of interest entity, such as sources that include aliases of the entity (e.g., "LAX") and/or other properties of the entity (e.g., the address of the airport).

In some implementations, additional information may include the prominence of content that is associated with the determined point of interest in one or more sources. For example, point of interest engine 105 may provide relevance engine 115 with a point of interest of "Chain Restaurant" based on the content of email 400. Relevance engine 115 may identify the term "Chain Restaurant" in the subject line 415 of email 400 as additional information that may be utilized to determine a relevance score for "Chain Restaurant." Also, for example, relevance engine 115 may identify special formatting of references to a point of interest in content of one or more sources as additional information that may be utilized to determine a relevance score for a point of interest.

In some implementations, additional information may include information related to the sender and/or author of the source of content that includes the determined point of interest. For example, point of interest engine 105 may provide relevance engine 115 with a determined point of interest of "LAX" and "booking@exampleairline.com" as sender of email 200. Alternatively, point of interest engine 105 may provide all or part of email 200 to relevance engine 115 and relevance engine 115 may identify the sender of the email 200. Also, for example, point of interest engine 105 may determine a point of interest from a calendar entry of the user and provide relevance engine 115 with the point of interest and an indication that the user was the creator of the content.

In some implementations, relevance engine 115 may identify additional information that includes location information of the user. For example, relevance engine 115 may identify previous locations of the user as indicated by GPS, triangulation of cellular phone signals, user check-ins, etc. Also, for example, relevance engine 115 may identify online check-ins of the user at one or more locations. In some implementations, previous location information for the user may be identified from content database 110. In some implementations, point of interest engine 105 may provide relevance engine 115 with a point of interest and additional information that includes location information, which may be utilized by relevance engine 115 to determine a relevance score.

Figure 4:
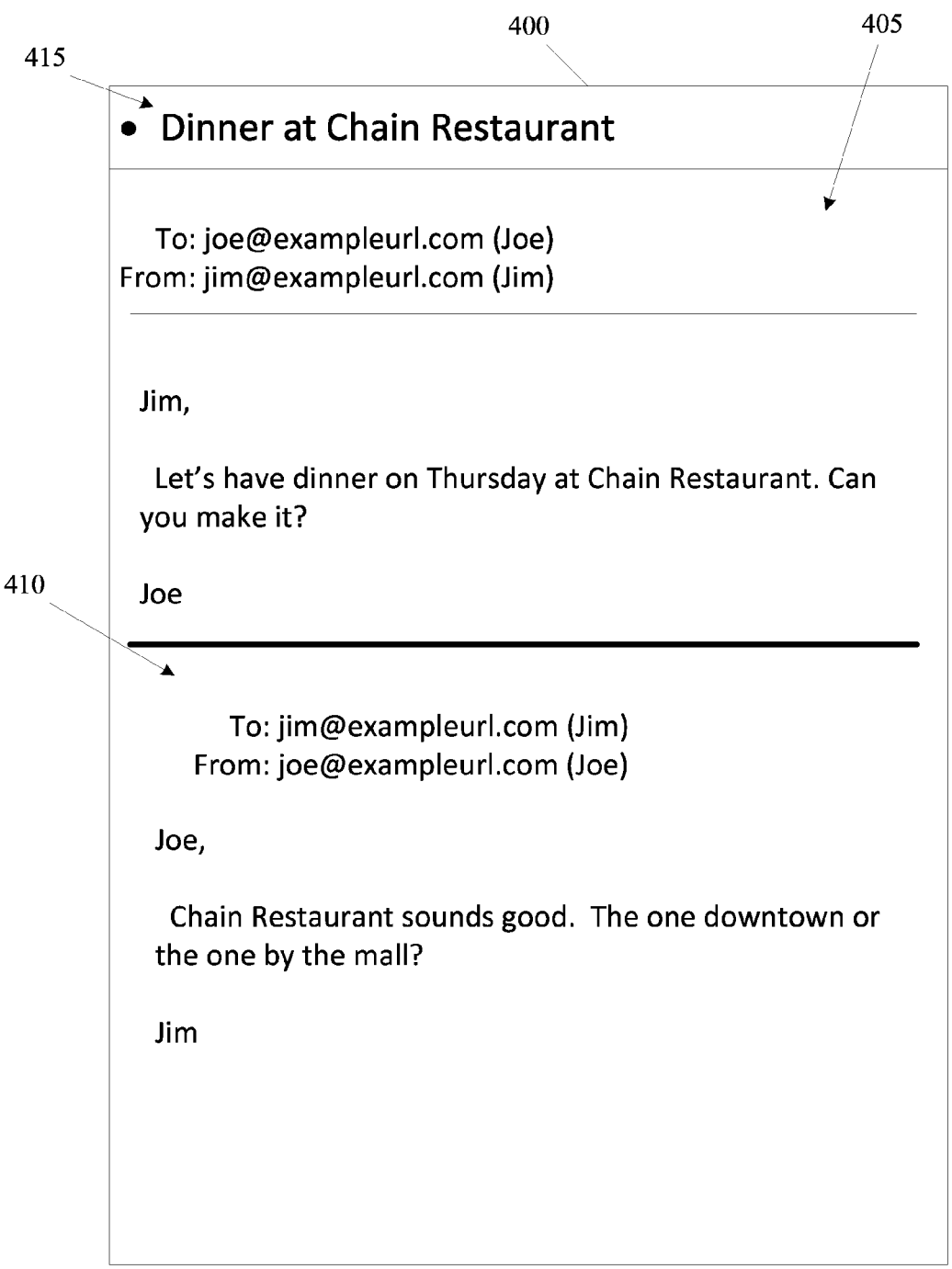
FIG. 4 is an illustration of a sample message that includes content that may be utilized as additional information to determine a relevance score for a point of interest.

For example, referring to FIG. 4, point of interest engine 105 may determine multiple points of interest for "Chain Restaurant" based on content of email 400. Point of interest engine 105 may provide relevance engine 115 with the point of interest "Chain Restaurant" and/or the address of one or more locations of "Chain Restaurant." In some implementations, relevance engine 115 may identify indications of one or more instances of the user at and/or near one or more of the determined locations of "Chain Restaurant." Relevance engine 115 may utilize the identified instances of the presence of the user at and/or near the locations of "Chain Restaurant" to determine relevance scores for one or more of the determined points of interest.

Relevance engine 115 may determine a relevance score for a determined point of interest based on identified additional information. In some implementations, relevance engine 115 may determine a relevance score that is a binary value. For example, relevance engine 115 may determine that a point of interest is either of interest to the user or not of interest to the user. In some implementations, relevance engine 115 may determine a relevance score that is a numerical value, such as a value from 0 to 1 or a value from 0 to 100. For example, relevance engine 115 may determine a relevance score for a point of interest, wherein a value of 0 is indicative of no user interest in being provided the point of interest and 100 is indicative of high user interest in the point of interest (with values in between indicative of relative interest).

In some implementations, a relevance score may be determined based on identified references to the point of interest in content of one or more sources associated with the user. In some implementations, a relevance score for a point of interest may be based on a count of sources associated with the user that include a reference to the point of interest. For example, point of interest engine 105 may determine a point of interest and provide the point of interest to relevance engine 115. In some implementations, relevance engine 115 may identify sources that include references to the point of interest and determine the relevance score based on a count of the sources that include at least one reference to the point of interest. For example, relevance engine 115 may determine a relevance score based on determining that a threshold number of sources include a reference to the point of interest and/or a count of sources that include a reference to the point of interest during a time period. Also, for example, relevance engine 115 may determine a relevance score based on determining a frequency of sources that include a reference to the point of interest (frequency of sources that include a reference over a time period, in all sources associated with the user, in sources that include a point of interest, etc.). In some implementations, a relevance score for a point of interest may be based on a count of references to a determined point of interest in content of one or more sources. For example, point of interest engine 105 may provide relevance engine 115 with a determined point of interest and content from the source that was utilized to determine the point of interest. Relevance engine 115 may identify the count of references to the point of interest in the source and/or relevance engine 115 may identify other sources that include a reference to the point of interest and determine a frequency of the number of references to the point of interest in multiple sources. Relevance engine 115 may utilize the count of references to the point of interest to determine a relevance score for the point of interest. Also, for example, relevance engine 115 may determine a frequency of references to the point of interest. For example, relevance engine 115 may determine a relevance score based on frequency of references to the point of interest in all references to points of interest, frequency of references to the point of interest in all references to points of interest in a source, frequency of references over a time period, etc.

In some implementations, a relevance score may be based on a time that is associated with one or more sources that include content related to the point of interest. In some implementations, a relevance score may be based on recency of references to a determined point of interest in one or more sources. For example, relevance engine 115 may determine a relevance score for a point of interest that is mentioned in a source 24 hours ago that is more indicative of user interest in the point of interest than a point of interest that was mentioned in a source one week ago. Also, for example, relevance engine 115 may determine a relevance score for a point of interest based on a time that is referenced in one or more sources that include a reference to the point of interest. For example, relevance engine 115 may determine a relevance score that is more indicative of relevance for a point of interest that is referred to in a source that includes "We ate there last week" than a point of interest that is referred to in a source that includes "We ate there last year" based on a likelihood that the reference in a source that includes a more recent time may be more relevant to the user than a point of interest that is mentioned with a less recent time.

In some implementations, a relevance score for a point of interest may be based on an indication of regularity of interaction of the user with the point of interest. For example, a relevance score may be based on identifying that the user interacts with the point of interest on a regular basis such as a monthly basis, at least one morning per week, and/or at least once every week, month, year, etc. An indication of regularity of interaction with a point of interest may be determined based on, for example, location information of the user that indicates presence at and/or near the point of interest multiple times over a time period, a recurring calendar event of the user related to the point of interest, viewing of one or more documents associated with the point of interest multiple times over a time period, search queries of the user related to the point of interest multiple times over a time period, etc.

In some implementations, one or more additional times that are associated with a source may be utilized to determine a relevance score for a point of interest that is related to content of the source. For example, a message may include content related to a point of interest. The message may be associated with a receiving time that is indicative of when the user received the message and/or a viewing time that is indicative of when the user accessed the message. For example, relevance engine 115 may determine a relevance score that is more indicative of relevance when the user first receives the message than at a later time after the receiving time. Also, for example, relevance engine 115 may determine a relevance score at a first time shortly after a user first accesses a message that is more indicative of relevance than a relevance score determined at a later time that is after the first time.

In some implementations, a relevance score may be determined for a point of interest based on the current time that is associated with content related to the point of interest. For example, referring to FIG. 3, hotel address 315 may be a determined point of interest. In some implementations, relevance engine 115 may identify the check-in date and check-out date as additional information to determine a relevance score for the point of interest. Relevance engine 115 may determine a relevance score for the point of interest that is more indicative of relevance between the check-in date and the check-out date than a determined relevance score for the point of interest after the check-out date. Also, for example, relevance engine 115 may determine a relevance score that becomes more indicative of relevance for the point of interest as the check-in date approaches, reaches a peak relevance score at the check-in date, and decreases after the check-out date.

In some implementations, a relevance score may be determined based on additional information that includes location information for a user. In some implementations, a relevance score for a point of interest may be based on frequency of a user in the vicinity of the point of interest. For example, a relevance score may be based on the number of times a user visited the point of interest, the frequency of the user visiting a first point of interest versus a second determined point of interest, the recency of a user visit to a point of interest, and/or the length of time that a user visited a point of interest in the past. For example, based on content of email 400, point of interest engine 105 may determine that "Chain Restaurant" is a point of interest and that there are two locations for "Chain Restaurant," such as by identifying two addresses that are mapped to an entity associated with "Chain Restaurant" in entity database 120. Point of interest engine 105 may provide relevance engine 115 with the two addresses and relevance engine 115 may determine a relevance score for each of the locations based on identified user presence at each of the locations. A count of the user at each location (or frequency of the user at one of the locations versus the other location), the recency of the user at each of the locations, and/or the length of stay of the user at each of the locations may be utilized to determine a relevance score for each of the locations.

In some implementations, a relevance score may be determined based on identifying the distance between one or more determined points of interest and another location that is identified from one or more sources of the user. For example, as previously described, point of interest engine 105 may determine multiple gas station locations as points of interest based on the content of email 300. Relevance engine 115 may identify email 300 as additional information and further identify both "123 Airport Road" and "200 S. Main Street" as locations that are included in the content of email 300. Relevance engine 115 may determine a relevance score for a given gas station of the determined points of interest (i.e., the gas station locations) based on determining the distance between the given gas station and one or both of the identified addresses.

In some implementations, a personal map may be provided to the user with one or more characteristics that are determined based on relevance scores of points of interests. A personal map may have one or more distinctive visual indications that may be adjusted based on relevance scores. For example, a personal map may be provided to the user with one or more points of interest displayed with varied iconography (e.g. special symbols based on the type of point of interest), various colors, various sizes, and/or with terms of various typesets (e.g., font, bold, italics). Also, for example, additional information about a point of interest may be provided via a customized point of interest display, such as an airport point of interest that is provided with an identified flight check-in time and/or with a flight number that have been identified from content of one or more sources that are related to the point of interest.

Figure 6:
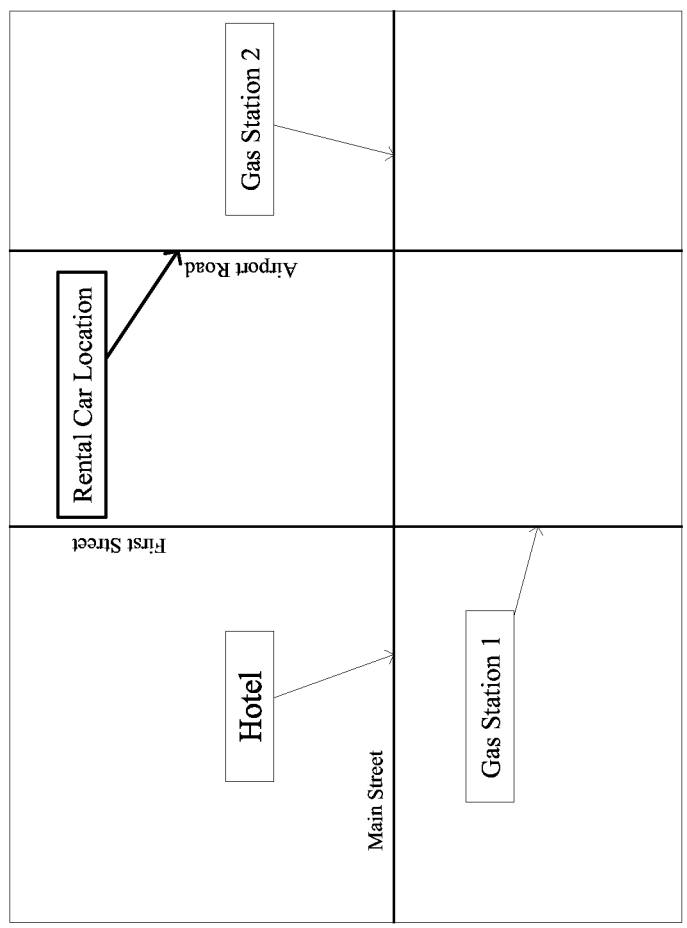
FIG. 6 is an example illustration of determined points of interest and additional locations.

For example, referring to FIG. 6, an example illustration of determined points of interest and additional locations is provided. The illustration includes two gas stations, "Gas Station 1" and "Gas Station 2," which may be determined by point of interest engine 105 as points of interest utilizing content of email 300, as described herein. Relevance engine 115 may identify rental car address 310 and hotel address 315 as additional information as described herein. Locations of the hotel and rental car location are provided on the illustration of FIG. 8. In some implementations, relevance engine 115 may determine relevance scores for "Gas Station 1" and "Gas Station 2" based on distances between the points of interest and the identified rental car address 310 and hotel address 315. For example, a relevance score for "Gas Station 1" may be determined based on distance between "Gas Station 1" and hotel address 315 and/or distance between "Gas Station 1" and rental car address 310. Also, for example, relevance engine 115 may determine a relevance score for "Gas Station 2" based on distance between "Gas Station 2" and hotel address 315 and/or distance between "Gas Station 2" and rental car address 310.

In some implementations, distance between points of interest and additional identified locations may be weighted when utilized to determine relevance scores. For example, relevance engine 115 may determine that distance between a determined gas station point of interest and an identified rental car location may be weighted more heavily than distance between the gas station point of interest and an identified hotel location. Relevance engine 115 may determine weights to assign to one or more distances between additional identified locations and a determined point of interest based on, for example, identified trends in previous location data, weights that are associated with one or more entities and/or relationships between entities in entity database 120, and/or one or more factors that are identified from the content of the source (prominence of the additional identified locations in the content, formatting in the content, metadata, etc.). A relevance score for "Gas Station 2" may be determined that is more indicative of relevance to the user than a relevance score for "Gas Station 1" based on determining that "Gas Station 2" is nearer to "Rental Car Location." In some implementations, distance between determined points of interest and additional locations may be evenly weighted when determining relevance scores. In some implementations, a likely path between additional identified locations may be utilized to determine a relevance score. For example, relevance score for one or more of the gas station points of interest may be determined based on deviation distance from a path between "Hotel" and "Rental Car Location."

In some implementations, relevance scores may be based on trustworthiness of the origin of the source of additional information. For example, relevance engine 115 may determine a relevance score for a point of interest that was determined from a calendar entry that was created by the user that is more indicative of relevance than a point of interest that was determined from an email from an unsolicited advertiser.

Relevance scores may be utilized to provide indications of points of interest on a map that is responsive to a mapping request. For example, in some implementations, a user may submit a mapping request for a geographic area. The user may be provided with a map that is responsive to the mapping request via user device 125. In some implementations, a map may be provided to a user that includes indications of one or more points of interest that are included in the geographic area. For example, a map may be provided to a user that includes restaurants, hotels, tourist attractions, and/or other point of interest provided on the map via a graphical indication.

In some implementations, one or more points of interest that are provided points of interest may be those determined by point of interest engine 105. For example, point of interest engine 105 may determine a point of interest based on content in a source that is associated with the user and an indication, such as a star, an information box, and/or another indication of the location of the point of interest may be provided to the user on a map that is responsive to a mapping request, wherein the mapped geographic area includes the point of interest. In some implementations, determined points of interest may be provided to the user in addition to other points of interest that were not determined by the point of interest engine 105. In some implementations, an indication of a point of interest that was determined by the point of interest engine 105 may be provided with a different indication than other points of interest that were not determined by the point of interest engine 105. For example, points of interest that were determined by point of interest engine 105 may be provided in a color that is different than one or more colors for other indications of points of interest.

Figure 5A:
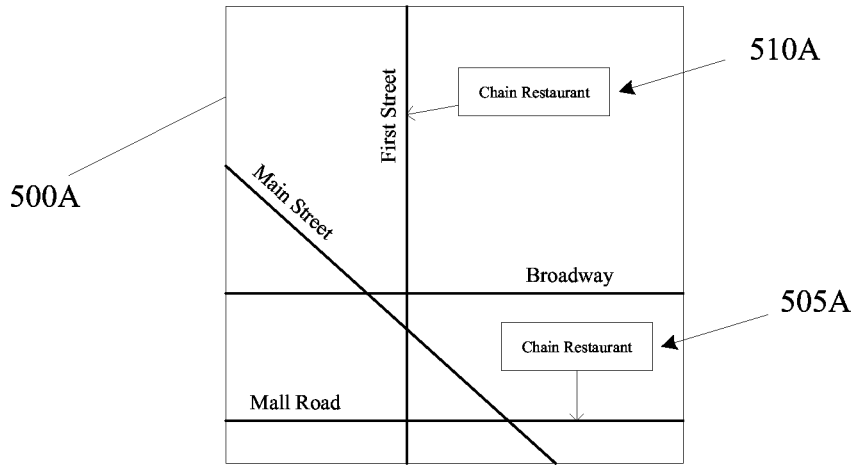
FIG. 5A is an example graphical user interface for providing a map to a user that includes indications of points of interest.

Referring to FIG. 5A, an example graphical user interface for providing a map to a user that includes indications of points of interest is provided. The map 500A includes two indications of points of interest, restaurant indication 505A and restaurant indication 510A. In some implementations, one or both of the restaurant indications 505A and 510A may be determined by point of interest engine 105. For example, point of interest engine 105 may determine points of interest corresponding to restaurant indication 505A and 510A based on content from email 400.

In some implementations, indications of one or more points of interest may be provided with a map based on determined relevance scores for the points of interest. For example, an indication of a point of interest may be provided with a map only if a determined relevance score satisfies a threshold value. In some implementations, points of interest may be provided with a prominence based on the relevance score of the points of interest. For example, a point of interest may be provided with a higher prominence than a second point of interest if the relevance score of the first point of interest is more indicative of relevance than the second point of interest. Prominence may include, for example, size of font of a point of interest indication, color of a point of interest indication, and/or size of a marker of the point of interest indication.

Figure 5B:
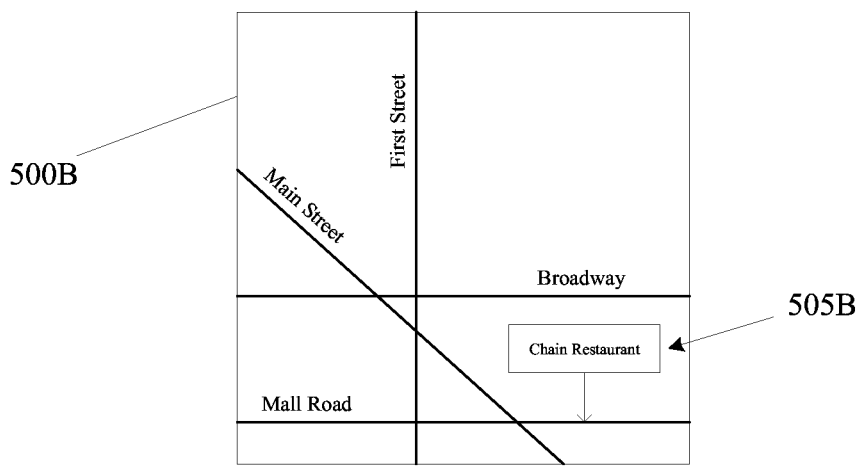
FIG. 5B is an example graphical user interface for providing a map with points of interest to a user based on determined relevance scores for the points of interest.

For example, referring to FIG. 5B, an example graphical user interface for providing a map with points of interest to a user based on determined relevance scores for the points of interest is provided. Map 500B may be responsive to the same mapping request as map 500A of FIG. 5A. Map 500B includes restaurant indication 505B. Restaurant indication 505B may be the same indication as restaurant indication 505A. In some implementations, restaurant indication 505B may be provided with the map based on a determined relevance score for the corresponding point of interest satisfying a threshold. An additional point of interest indication for restaurant indication 510A of map 500A is not provided with map 500B. In some implementations, point of interest engine 105 may determine a point of interest for the restaurant corresponding to restaurant indication 510A and relevance engine 115 may determine a relevance score for the point of interest. An indication of the restaurant corresponding to restaurant indication 510A may not be provided, as illustrated in FIG. 5B, based on determining that the relevance score for the point of interest does not satisfy a threshold value.

Figure 5C:
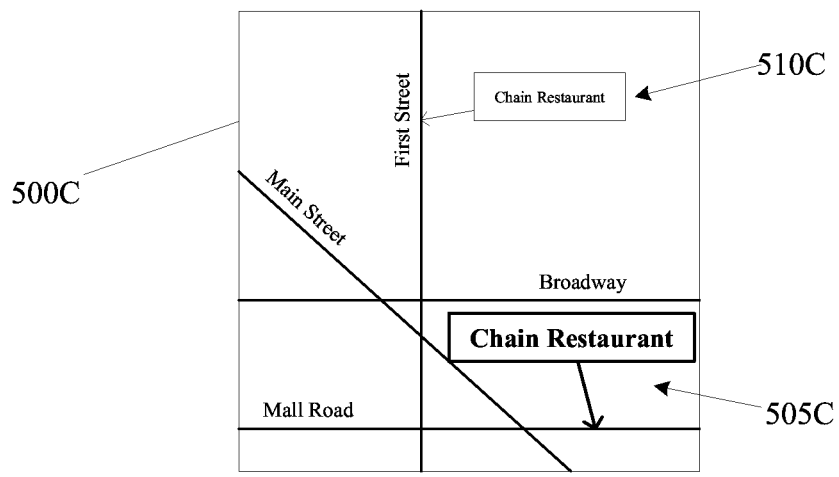
FIG. 5C is another example graphical user interface for providing a map with points of interest to a user based on determined relevance scores for the points of interest.

Referring to FIG. 5C, an example graphical user interface for providing a map with points of interest to a user with a prominence based on determined relevance scores for the points of interest is provided. Map 500C may be responsive to the same mapping request as map 500A of FIG. 5A and map 500B of FIG. 5B. In some implementations, point of interest engine 105 may determine points of interest that correspond to restaurant indication 505C and restaurant indication 510C. In some implementations, relevance engine 115 may determine relevance scores for the points of interest as described herein. For example, point of interest engine 105 may determine the points of interest based on content of email 400 of FIG. 4. Relevance engine 115 may determine relevance scores for the points of interest based on additional information from email 400 and/or from additional sources, such as previous location history of the user, number of indications of each of the points of interest in additional sources, and/or content from one or more additional sources. Restaurant indication 505C is provided with a higher prominence that restaurant indication 510C based on the relevance score of the point of interest corresponding to each of the indications. For example, relevance engine 115 may determine a relevance score for the restaurant that is represented by restaurant indication 505C that is more indicative of relevance than the determined relevance score for the point of interest that is represented by restaurant indication 510C. For example, based on previous location information of the user and/or additional content that includes one or more of the points of interest, relevance engine 115 may determine that the user likely has more interest in the point of interest corresponding to restaurant indication 505C than the point of interest represented by restaurant indication 510C. In the illustrated interface, restaurant indication 510C is provided with larger font than restaurant indication 510C. Additionally, restaurant indication 505C is provided in bold. In some implementations, additional or alternate prominence indications may be utilized, such as different colors and/or different markers.

In some implementations, relevance scores for points of interest may be utilized to provide the user with a listing of points of interest, wherein the order of points of interest is determined based on relevance scores. For example, a user may be provided a listing of nearby points of interest via an application executing on user device 125. A point of interest with a relevance score that is more indicative of relevance may be provided higher in the listing than a point of interest with a relevance score that is less indicative of relevance. Also, for example, a point of interest may be provided in the listing only if the relevance score satisfies a threshold value.

Figure 7:
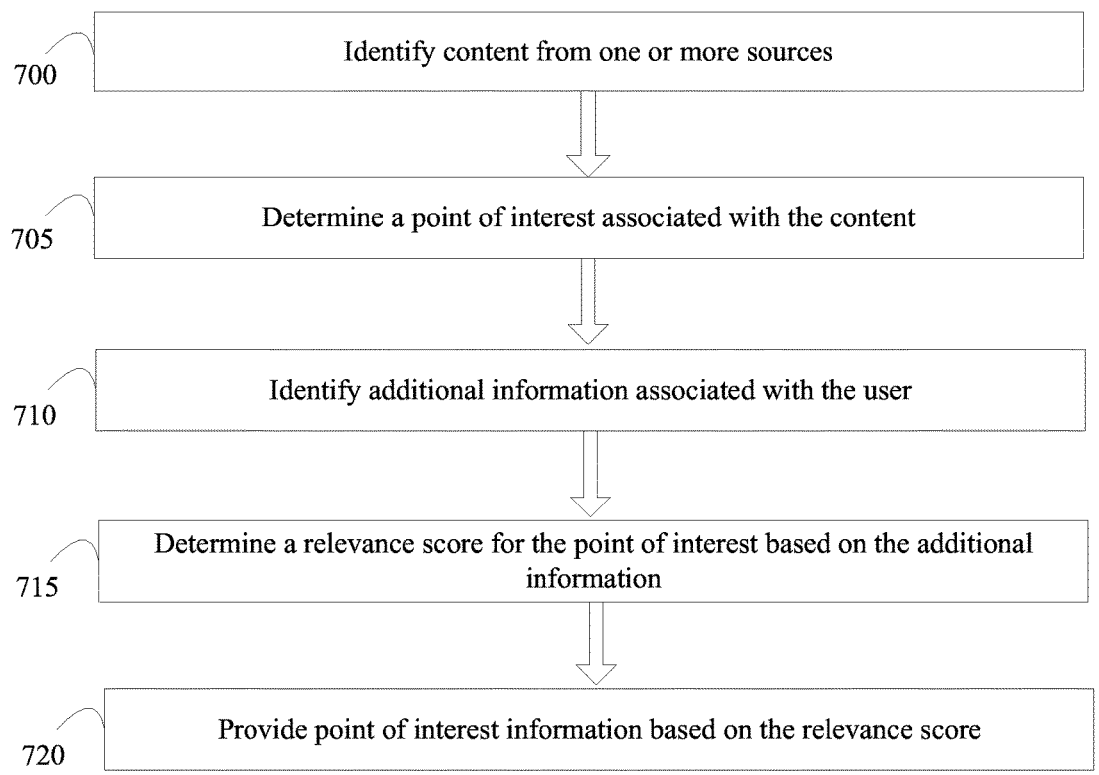
FIG. 7 is a flowchart illustrating an example method of determining a point of interest for a user based on content of one or more sources associated with the user.

Referring to FIG. 7, a flowchart is illustrated of an example method of determining a point of interest for a user based on content of one or more sources associated with the user. Other implementations may perform the steps in a different order, omit certain steps, and/or perform different and/or additional steps than those illustrated in FIG. 7. For convenience, aspects of FIG. 7 will be described with reference to one or more components of FIG. 1 that may perform the method such as the point of interest engine 105.

At step 700, content is identified from one or more sources. In some implementations, content is identified by a component that shares one or more characteristics with point of interest engine 105. In some implementations, sources that may include content associated with a point of interest may be identified by a component that shares one or more characteristics with point of interest engine 105. For example, point of interest engine 105 may identify emails, instant messages, web history, previous location information for the user, calendar entries, and/or other documents associated with the user as sources that may include content related to a point of interest.

At step 705, a point of interest is determined based on the content of the identified sources. In some implementations, the point of interest may be determined based on an indication of the point of interest in the source. For example, "123 Airport Road" may be determined to be a point of interest based on identifying the terms "123 Airport Road"

in content of a source. In some implementations, a point of interest may be determined that is related to a location that is indicated in a message. For example, an email may include information related to a rental car and point of interest engine 105 may determine one or more gas stations as points of interest. Point of interest engine 105 may determine one or more points of interest that are related to a location in content based on, for example, identifying a relationship between an entity that is indicated in the content and a related entity that is identified via entity database 120 and/or other databases. In some implementations, point of interest engine 105 may determine multiple points of interest from content of a source. For example, point of interest engine 105 may determine multiple locations of a restaurant as points of interest based on identifying a single reference to the name of a restaurant in the content.

At step 710, additional information that is associated with the user is identified. In some implementations, the additional information may be from the same source as the content that was utilized to determine the point of interest. For example, an email may be utilized to determine a point of interest and additional information from the email may be identified as additional information, such as sender of the message, formatting of terms in the message, and/or metadata associated with the message. In some implementations, additional information may be identified from one or more sources that were not utilized to determine the point of interest. For example, content of an email may be utilized to determine a point of interest and additional information may be identified from other emails, previous location information of the user, web history of the user, and/or one or more additional sources of content.

At step 715, a relevance score is determined for the point of interest based on the additional information. The relevance score may be determined by a component that shares one or more characteristics with relevance engine 115. In some implementations, a relevance score may be a binary value. For example, a relevance score for a point of interest may be "relevant" or "not relevant," or another binary value. In some implementations, a relevance score may be a scale of relevance, such as a value between 0 and 100.

In some implementations, relevance scores may be based on a trustworthiness measure of the origin of the source of additional information. For example, relevance engine 115 may determine a relevance score for a point of interest that was determined from a calendar entry that was created by the user that is more indicative of relevance than a point of interest that was determined from an email from an unsolicited advertiser. In some implementations, relevance scores may be determined based on past location information of the user. For example, relevance engine 115 may determine a relevance score for a point of interest based on frequency of user visits to the point of interest, recency of the last visit of the user to the location, and/or length of one or more visits of the user to the point of interest. In some implementations, relevance scores may be determined based on prominence of one or more terms related to the point of interest in a source. For example, relevance engine 115 may determine a relevance score for a point of interest that is mentioned in the heading of an email that is more indicative of relevance than a point of interest that is included in the body of the email. Also, for example, relevance scores may be determined based on formatting of terms in a source.

In some implementations, a current time may be utilized to determine a relevance score for a point of interest. For example, a time may be identified as related to a point of interest and a relevance score may be determined based on the time between the current time and the identified associated time. A relevance score may be determined that becomes more indicative of relevance as the time associated with the point of interest approaches, as described herein. In some implementations, one or more additional factors may be utilized to determine a relevance score, as previously described.

At step 720, point of interest information is provided based on the relevance score. In some implementations, point of interest information may be provided via a mapping application. For example, a map may be provided to the user that includes indications of one or more determined points of interest. In some implementations, points of interest may be provided via a mapping application only if the associated relevance score satisfies a threshold. For example, relevance engine 115 may determine a binary relevance score for a point of interest and an indication of the point of interest may be provided only if the point of interest was determined to be "relevant." In some implementations, a point of interest may be provided on a map with a prominence that is related to the determined relevance score. For example, the size of an indication of a point of interest on a map may be related to the determined relevance score for the point of interest, wherein a point of interest may appear larger than a point of interest with a relevance score that is less indicative of relevance.

In some implementations, point of interest information may be provided to a user via a listing of one or more points of interest. For example, a user may be provided with a listing of multiple points of interest within a threshold distance from the user. In some implementations, the ordering of one or more points of interest in a listing may be based on a determined relevance score for the points of interest. For example, a point of interest may appear higher in a listing of points of interest than a point of interest with a determined relevance score that is less indicative of relevance. Also, for example, a point of interest may be provided in a listing only if the determined relevance score for the point of interest satisfies a threshold value.

Figure 8:
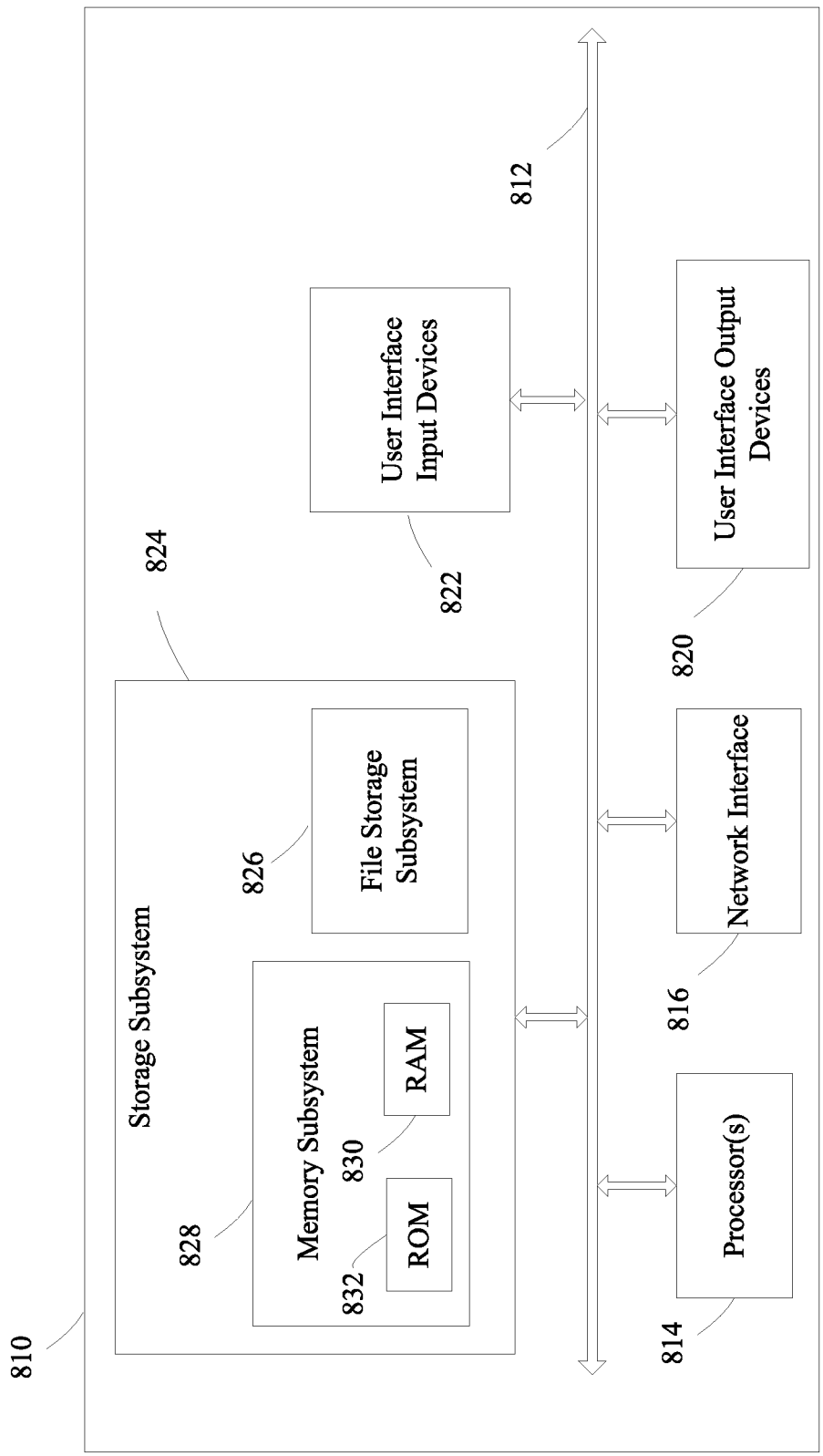
FIG. 8 illustrates a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to determine a point of interest from content of one or more sources associated with a user. As another example, the storage subsystem 824 may include the logic to determine a relevance score for a point of interest based on additional information associated with the user.

These software modules are generally executed by processor 814 alone or in combination with other processors. Memory 825 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   determining, from content of an electronic communication sent to a user, a first location having a first entity class;
   determining a point of interest having a second entity class based on a mapping between the first entity class corresponding to the first location and the second entity class corresponding to the point of interest in an electronic source that is external to the content,
      wherein the point of interest is a physical location, and
      wherein the first location does not have the second entity class and the point of interest does not have the first entity class;
   identifying a temporal indication from the content of the electronic communication sent to the user, the temporal indication being associated with the first location, and the temporal indication being one or both of a particular date and a particular time;
   determining a relevance score for the point of interest based on both:
      a distance between the point of interest and the first location, and
      the temporal indication associated with the first location; and
   providing, based on the relevance score, a visual indication of the point of interest, the visual indication provided for display to the user in a rendered map via a mapping application.

2. The method of claim 1, wherein providing the visual indication of the point of interest comprises providing the temporal indication associated with the first location, in addition to the visual indication of the point of interest, for display of the temporal indication to the user in the rendered map.

3. The method of claim 1, further comprising:
   determining an additional distance between a second location and the point of interest;
   wherein determining the relevance score for the point of interest is further based on the additional distance.

4. The method of claim 3, further comprising:
   determining the second location from the content of the electronic communication, the second location having a third entity class and not having the first entity class or the second entity class.

5. The method of claim 3, wherein the second location has a third entity class and does not have the first entity class or the second entity class.

6. The method of claim 1, wherein providing, based on the relevance score, includes determining a prominence level for the visual indication based on the relevance score.

7. A system, comprising:
   at least one network interface;
   memory storing instructions;
   one or more processors configured to execute the instructions stored in the memory, wherein in executing the instructions the one or more processors are to:
      determine, from content of an electronic communication sent to a user, a first location having a first entity class;
      determine a point of interest having a second entity class based on a mapping between the first entity class corresponding to the first location and the second entity class corresponding to the point of interest in an electronic source that is external to the content and that is accessed via the at least one network interface,
   wherein the point of interest is a physical location, and
   wherein the first location does not have the second entity class and the point of interest does not have the first entity class;
identify a temporal indication, from the content of the electronic communication sent to the user, the temporal indication being associated with the first location, and the temporal indication being one or both of a particular date and a particular time;
determine a relevance score for the point of interest based on both:
   a distance between the point of interest and the first location, and
   the temporal indication associated with the first location; and
provide, based on the relevance score, a visual indication of the point of interest, the visual indication provided for display to the user in a rendered map via a mapping application.

8. The system of claim 7, wherein in providing the visual indication of the point of interest, one or more of the processors are to provide the temporal indication associated with the first location, in addition to the visual indication of the point of interest, for display of the temporal indication to the user in the rendered map.

9. The system of claim 7, wherein in executing the instructions one or more of the processors are further to:
determine an additional distance between a second location and the point of interest;
wherein in determining the relevance score for the point of interest, one or more of the processors are to determine the relevance score further based on the additional distance.

10. The system of claim 9, wherein in executing the instructions one or more of the processors are further to:
determine the second location from the content of the electronic communication, the second location having a third entity class and not having the first entity class or the second entity class.

11. The system of claim 9, wherein the second location has a third entity class and does not have the first entity class or the second entity class.

12. The system of claim 7, wherein in providing the visual indication of the point of interest, one or more of the processors are to determine a prominence level for the visual indication in the providing based on the relevance score.

13. At least one non-transitory computer readable storage medium storing instructions executable by a processor, the instructions including instructions to:
determine, from content of an electronic communication sent to a user, a first location having a first entity class;
determine a point of interest having a second entity class based on a mapping between the first entity class corresponding to the first location and the second entity class corresponding to the point of interest in an electronic source that is external to the content,
   wherein the point of interest is a physical location, and
   wherein the first location does not have the second entity class and the point of interest does not have the first entity class;
identify a temporal indication from the content of the electronic communication, the temporal indication being associated with the first location, and the temporal indication being one or both of a particular date and a particular time;
determine a relevance score for the point of interest based on both:
   a distance between the point of interest and the first location, and
   the temporal indication associated with the first location; and
provide, based on the relevance score, a visual indication of the point of interest, the visual indication provided for display to the user in a rendered map via a mapping application.

14. The at least one non-transitory computer readable storage medium of claim 13, wherein the instructions to provide the visual indication of the point of interest include instructions to provide the temporal indication associated with the first location, in addition to the visual indication of the point of interest, for display of the temporal indication to the user in the rendered map.

15. The at least one non-transitory computer readable storage medium of claim 13, wherein the instructions further include instructions to:
determine an additional distance between a second location and the point of interest;
wherein the instructions to determine the relevance score for the point of interest include instructions to determine the relevance score further based on the additional distance.

16. The at least one non-transitory computer readable storage medium of claim 13, wherein the instructions to provide the visual indication of the point of interest include instructions to provide the point of interest with a prominence level that is based on the relevance score.

* * * * *